Feb. 7, 1967  R. R. MYERS  3,303,263
BUNDLE SPACER DEVICES
Filed July 9, 1965  3 Sheets-Sheet 1
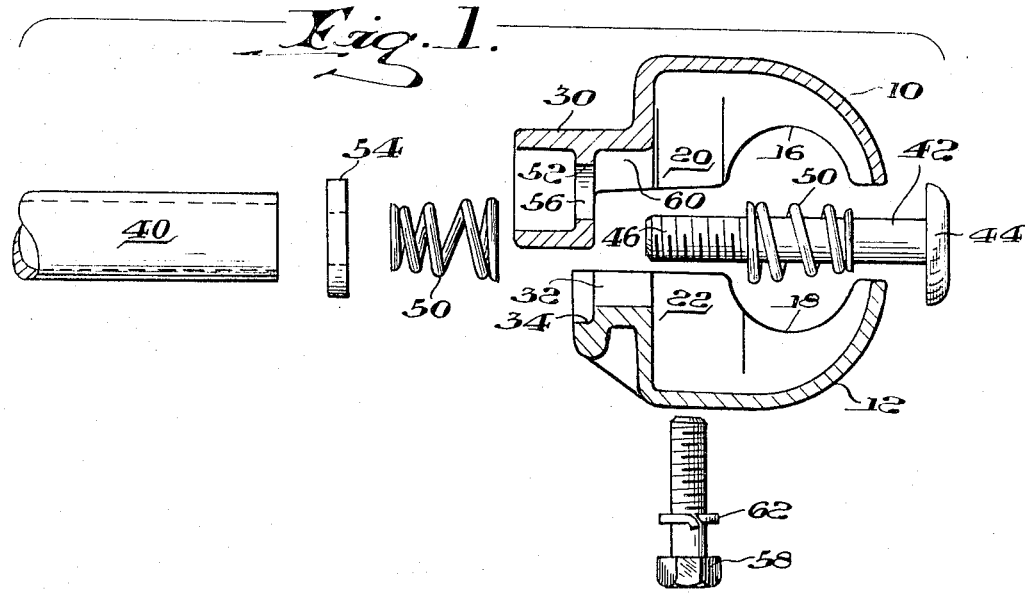
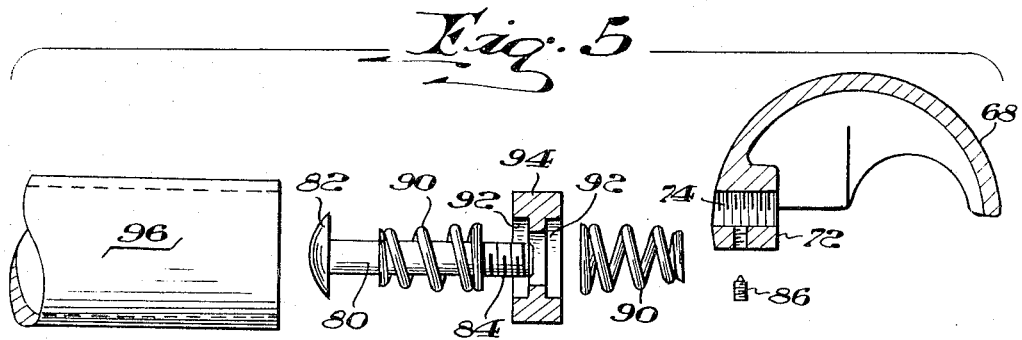
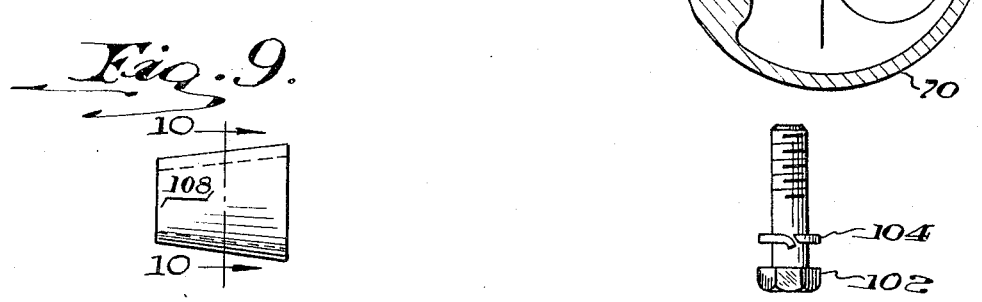
INVENTOR.
ROBERT R. MYERS.
BY
his ATTORNEY.

Feb. 7, 1967 R. R. MYERS 3,303,263
BUNDLE SPACER DEVICES
Filed July 9, 1965 3 Sheets-Sheet 2
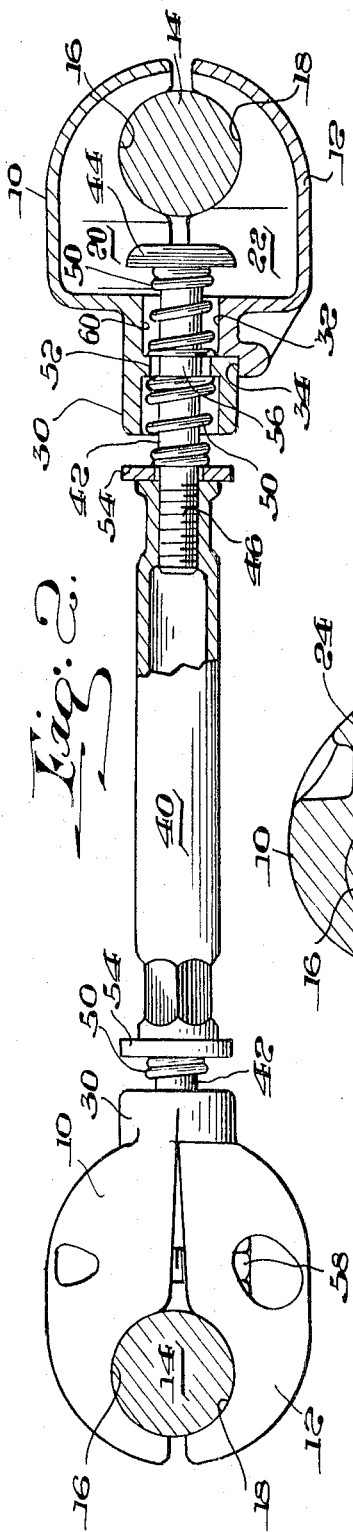
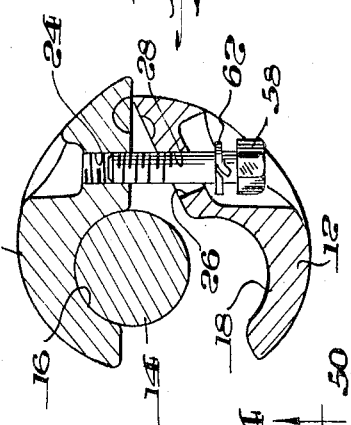
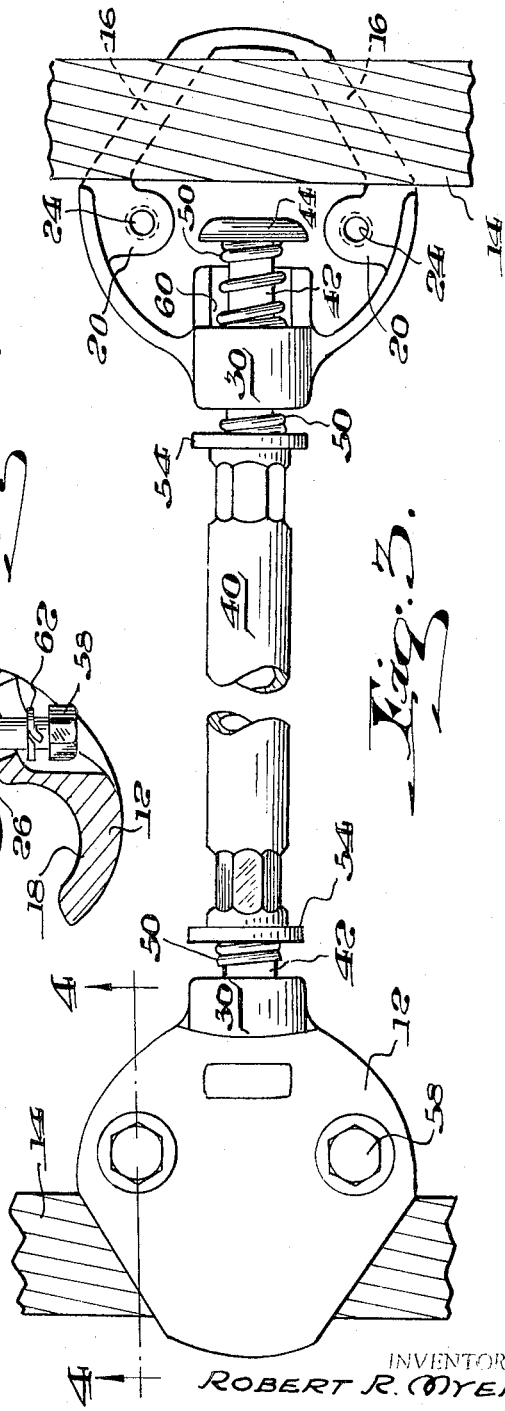
INVENTOR.
ROBERT R. MYERS.
BY
his ATTORNEY.

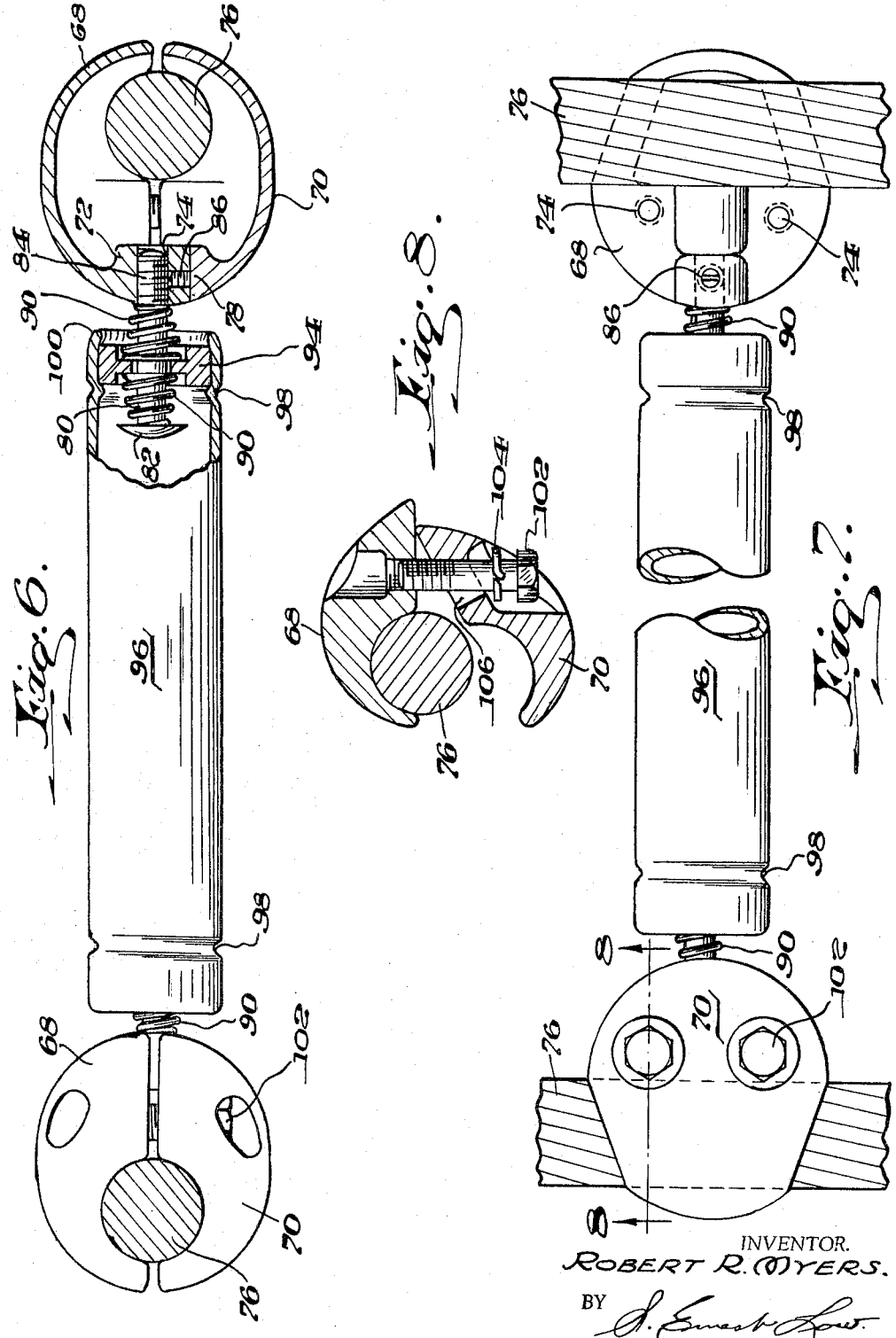

United States Patent Office 3,303,263
Patented Feb. 7, 1967

3,303,263
BUNDLE SPACER DEVICES
Robert R. Myers, McKeesport, Pa., assignor to Aluminum Company of America, Pittsburgh, Pa., a corporation of Pennsylvania
Filed July 9, 1965, Ser. No. 470,703
14 Claims. (Cl. 174—42)

This invention relates in general to spacer devices for association with a bundle of two or more parallel spaced overhead elongate members exemplary of which are two or more electrical conductors or cables characteristic of a single phase electrical transmission or distribution system.

Bundle electrical conductor installations are increasing in popularity, where they are replacing single conductor per phase high voltage electrical transmission and distribution systems, with many favorable electrical and mechanical advantages attributable thereto. For example, bundle conductors of individually small diameter elongate members have eliminated the relatively higher corona losses inherent in large diameter single line conductors of the same capacity; have been found to be characterized by lower resistance and lower surge impedance than the single larger diameter conductor installations which they have replaced; have exhibited higher current-carrying capacity as compared to the single large conductor of equal cross-sectional area; and have permitted adaptation to the multiple single phase conductors in the bundle thereof of less expensive conventional and commercially available hardware and accessories.

The enumerated advantages thus gained, however, are no better than the spacers designed and employed in positive separation of the individual elongate members or conductors at spaced intervals along their axial lengths. In this regard, the spacers must be capable of providing sufficient rigidity and strength to insure and maintain the aforesaid transverse spacing and separation between the individual elongate conductors forming a bundle thereof, under imposed electrical and atmospheric loading conditions, while at the same time the spacer to be efficient must also permit relative longitudinal movement between the individual conductors, their relative vertical movement from wind-induced or aeolian vibrations, and also withstand electrodynamic forces developed between and imposed upon the conductors in a bundle thereof as a result of inadvertent short-circuit loading of high voltage bundle conductor installations. In this latter respect, electrical specifications are regularly specifying that electrical equipment, including spacer devices employed in extra high voltage (EHV) transmission and distribution systems, withstand short-circuit electrical loading within the range 20,000 to 40,000 amperes.

Minimum essential requirements in one form of acceptable elongate member or conductor bundle spacer device include separable clamping elements for unitary clamping attachment of the device on each of the elongate members in a bundle, in combination with a relatively rigid strut or distance spacer member connected at its opposite terminal ends to at least one clamp or clamping element of each separable pair thereof. In addition, the interconnections between the clamping elements and each opposite terminal end of the rigid strut member must be articulatable in their function and design to permit the aforesaid relative vertical movement of the individual conductors, as a result of wind-induced or aeolian vibrations, as well as to permit relative axial or longitudinal movement of the individual conductors in a bundle thereof.

It is known in practice and herein acknowledged to provide and employ pivotal interconnection between opposite terminal ends of the rigid struts and clamping elements adjacent thereto of conventional spacer devices of the general class to which the present invention is addressed. It has also been recognized to employ close-coiled, as well as open-coiled, spring members in lieu of the rigid struts in conventional spacer devices.

Regardless of the admitted success experienced with spacer devices of the above referred to types, it has been observed in practice that pivotal interconnecting terminal end connections between the rigid struts and adjacent clamping elements thereof develop looseness and wear and can be a source of considerable maintenance and replacement expense.

Substitution of close-coiled spring struts for the otherwise conventional rigid strut elements of spacer devices, although entirely satisfactory in columnar strength and stiffness to prevent separation and/or collapse of spacer devices so equipped under normal atmospheric, wind and steady current conditions, have failed in field testing through permanent distortion of their close-coiled spring strut members under electric short-circuit loading within the current range of 20,000 to 40,000 amperes. Similar failures have also been experienced in spacer devices incorporating open-coiled spring strut elements under the same extra high voltage (EHV) field testing short-circuit conditions with the added disadvantage of insufficient column strength of the open-coiled spring struts necessitating an increase in the number of spacer devices required in any given suspended span length of elongate members or electrical conductors equipped with such spacer devices.

It is therefore a primary object of the present invention to provide a spacer device incorporating a rigid strut member having the strength and stiffness necessary to not only minimize the number of spacers required in a given suspended span of a bundle of elongate members associated therewith, but also capable of resisting distortion under possible extra high short-circuit current (20,000 to 40,000 amperes) loading, in which opposite terminal ends of the strut element are each articulatably interconnected to at least one clamping member adjacent thereto under a resiliently biased flexible connection permitting relative movement of the elongate members and unitarily attached clamping members supported thereby in respect to axial and angular resiliently restrained movement and disposition of the rigid strut member or element.

Another object of the present invention is to provide a spacer device for positively separating elongate members exposed to imposed forces causing relative movement between the elongate members, generally classifiable as a conventional spacer device, but otherwise improved thereover by incorporating superior rigid strut articulated interconnections between each of the opposite terminal ends of the strut and adjacent clamping elements provided for attachment to and support of the spacer device on the elongate members.

A more specific object of the invention is to provide a bundle conductor spacer device incorporating a resiliently biased articulated connection between each of the opposite terminal ends of each spacer strut and at least one adjacent clamping element associated therewith, which connections are substantially devoid of initial and subsequently developed detrimental wear and looseness.

A further object of the invention is to provide a bundle conductor spacer device characterized by the incorporation therein of an improved resiliently biased interconnection between each of the opposite ends of the spacer strut or struts thereof and the conductor mounting clamping elements adjacent opposite terminal ends of each strut.

Other objects and advantages of the invention will become apparent and fully appreciated by those skilled in the art to which the present invention appertains on consideration of the following description and illustrations of exemplary elongate member bundle spacer devices selected for purposes of illustration of the scope and intent, and not limitation, of the invention, in which:

FIG. 1 represents a fragmentary exploded view, in partial medial section, of essential elements constituting an articulated connection between a terminal end of a distance spacer strut and at least one clamping element adjacent thereto satisfying spacer devices falling within the scope of the present invention;

FIG. 2 represents a partial medial sectional elevational view of an installed spacer device incorporating the several elements of FIG. 1;

FIG. 3 represents a bottom plan view of the installed spacer device of FIG. 2 with one clamping element thereof removed;

FIG. 4 represents a fragmentary sectional elevational view taken on the plane 4—4 of FIG. 3 prior to final clamped installation of the spacer device on an elongate member in a bundle thereof;

FIG. 5 represents a fragmentary exploded view, in partial medial section, of essential elements constituting an articulated connection between a terminal end of a distance spacer strut and at least one clamping element adjacent thereto and depicting a modified form of spacer device of the invention;

FIG. 6 represents a view similar to FIG. 2 of the modified form of spacer device illustrated in FIG. 5;

FIG. 7 represents a bottom plan view of the installed spacer device of FIG. 6 with one clamping element thereof removed;

FIG. 8 represents a fragmentary sectional elevational view taken on the plane 8—8 of FIG. 7 prior to final clamped installation of the spacer device on an elongate member in a bundle thereof;

FIG. 9 represents an elevational view of an elastomeric connector element substitutable for its equivalent resilient coiled spring element in either of the spacer devices illustrated in installed condition in FIGS. 2 and 6; and FIG. 10 represents a sectional view taken on the plane 10—10 of FIG. 9.

In general, spacer devices satisfying the invention include, as essential elements, a separable pair of clamping elements for clamping engagement on each elongate member or conductor of a bundle thereof in combination with a rigid distance spacer member or strut attached at each of its opposite terminal ends to at least one clamping element in each adjacent separable pair thereof. In addition, and in accordance with the invention, each opposite terminal end connection between a strut member and a clamping element of a cooperating separable pair adjacent thereto is provided in the form of a preloaded resiliently-biased articulated joint connection permitting resiliently restrained relative movement of the elongate members or conductors of a bundle thereof employing the spacer devices of the invention.

More specifically, and in regard to the articulated strut end connections of the invention, each such connection includes a pair of axially disposed resilient members, such as coiled springs, elastomeric tubular members, or the like, in lateral clearance surrounding disposition in respect to a rigid connector pin element extending therethrough and serving to interconnect each of the opposite terminal ends of a spacer strut element to at least one of its adjacent clamping elements under resiliently preloaded condition of the spring or like members.

Referring to the illustrations, and particularly FIGS. 1 through 4, one embodiment of spacer device of the invention is disclosed. Therein a bundle conductor spacer device satisfying the invention comprises an identically cooperating pair of conductor-engaging and clamping elements 10 and 12 for each conductor or elongate member in a bundle thereof, two such conductors or elongate members 14 having been selected for simplicity of description and illustration. The clamping elements 10 and 12 are interiorly cavitated, of shell-like configuration, and each presents a substantially hemispherical smooth blending exterior surface.

Outboard oppositely converging walls of clamp or clamping member 10 are provided with axially aligned substantially semi-circular grooved lands 16 for receiving and subsequent clamping engagement against the exterior surface of a conductor or elongate member 14 and inboard therefrom the opposite walls are inwardly thickened to provide oppositely disposed bosses 20 which are apertured and threaded at 24. Further inboard beyond the bosses 20, clamping element 10 is terminated to provide a cylindrical sleeve or collar extension 30 substantially centrally located between the bosses 20 with the central longitudinal axis thereof preferably substantially coplanar and normal to the longitudinal central axis of the conductor or elongate member 14 in clamping installed contact within the oppositely disposed grooved lands 16 of the clamp or clamping element 10.

Clamp or clamping element 12 of each pair of the cooperating clamping elements is also provided in its outboard oppositely converging walls with axially aligned semi-circular grooved lands 18 for receiving and subsequent installed clamping engagement against the exterior surface of the conductor or elongate member 14. Inboard therefrom the opposite walls of the clamp 12 are inwardly thickened to provide oppositely disposed bosses 22 which are apertured to provide divergingly elongated slots 26, as viewed from the plane of bosses 22 facing towards the bosses 20 in installed clamping relationship of a pair of the clamping elements 10 and 12, as best illustrated in FIG. 4.

Further inboard and beyond the bosses 22, clamping element 12 is provided with a semi-circular or open top channel formation 32 the inboard terminal end of which is stepped or grooved to provide a semi-circular shoulder engagement with the exterior cylindrical surface of the sleeve extension 30 of the clamping element 10, as at 34 (FIGS. 1 and 2), in installed condition of the cooperating clamps 10 and 12 on a conductor or elongate member 14.

The cooperating clamp or clamping elements 10 and 12 of each pair thereof having been described in their essential structural details, reference is now made to the distance spacer element or strut 40 and its articulated connection to one of, or to clamp or clamping element 10, at each of the opposite terminal ends thereof. The exploded view of FIG. 1 will be of aid in this respect.

It will be observed that the strut 40 is illustrated in the form of a length of rigid cylindrical tubing and that articulated connection of each of its opposite terminal ends to one each of the clamp or clamping elements 10 comprises a rigid connector pin element 42 headed at 44 and threaded at 46. The threads may be replaced by annular grooves, if desired, or other suitable surface roughening may be provided.

Two preferably substantially identical weight, length and calculated strength coiled steel springs 50 are provided having closed, ground and squared opposite ends and intermediate active open contiguous coils, the springs being also preferably frusto-conical in exterior convolute configuration.

The shank of the headed pin element 42 is axially inserted through one of the springs 50 with the small diameter end thereof under the head 44 and its larger diameter end disposed to contact against an apertured bottom wall 52 of the terminal sleeve or collar 30 of the clamping element 10. The second spring 50 is axially applied over the shank of the headed pin 42 in axially reversed direction to the first coiled spring 50 in large diameter closed end contact of the spring against the opposite side of the apertured end wall 52, with the threaded or otherwise roughened terminal end 46 extended into the bore in the strut 40 under an axially applied pre-loading force which compresses the springs 50 substantially equally and under which pre-loading force the tubular body of the strut 40 is compressively deformed between opposing split dies, such as hexagon cavitied dies, to permanently attach the terminal shank of the headed pin 42 in rigid axial connection to the strut 40. If desired, and it is usually preferred, a slightly enlarged diameter washer 54 can be employed between the small diameter end of the spring 50 adjacent the strut 40 to insure a flat bearing surface for the spring.

From the above-described assembly of the connection between a terminal end of the tubular strut 40 and clamping element 10, which is duplicated at the opposite terminal end thereof, it will be observed that the initially aligned disposition of the coaxial longitudinal axes of the strut 40 and each headed pin 42 permits universal tilting disposition of each of the clamping elements 10 about a point substantially centrally located at the intersection of the longitudinal axis of each pin 42 and the geometric center of each of the oversize apertures 56 one each in the bottom wall 52 of each of the cylindrical terminal collar extensions 30 medially the thickness of each end or bottom wall 52 thereof. In this connection, the clearance between oversize apertures 56 and the shanks of pins 42, as well as the clearance provided between the large interior diameter of the frusto-conical coiled springs 50 and the shanks of pins 42, permits the above-described independent universal tilting and resiliently biased articulated connection between the strut 40 and one each clamping element 10 at each end thereof.

Similarly, unitary clamping assembly of the remaining cooperating clamping element 12, by means of the bolts or screws 58, securing the spacer device on spaced elongate members or conductors 14 between the paired clamping elements 10 and 12 (FIGS. 2 and 3), permits the spacer device to adjust to relative movement between the elongate members 14 under the influence of the resiliently restraining forces exercised by the pre-loaded coiled springs 50. The right cylindrical bore of the cylindrical collar or sleeve 30 and similar coaxial right cylindrical bore formed by the mating right semi-cylindrical bores 32 and 60 on the outboard side of the bottom wall 52 are in each instance selected to provide circumferential clearance in axial increasing amount and axially opposite direction away from the bottom wall 52 in terms of the directionally opposite disposition of the two frusto-conical springs 50, which clearance can be predetermined in amount to compensate for and permit maximum expected movement of a conductor or elongatae member 14, and its fixedly clamped cooperating pairs of clamping elements 10 and 12 supported thereon, in relation to the longitudinal axis of the strut 40 and end connector pins 42.

Reference to FIG. 4 will disclose the angular depending disposition assumed by the clamping element 12 in an initial installation of a spacer device of the invention upon an elongate member or conductor 14. It will be observed that the inclined rear or inboard end wall 28 of each of the slots 26 provides outboard angular separation of the clamping elements 10 and 12 and entry of a conductor or elongate member 14 therebetween during initial unitary connection between the clamping elements 10 and 12 as a result of threaded engagement of the terminal ends of the bolts 58 within the tapped or threaded apertures 24 carried by each clamping element 10. A lock washer 62 is preferably provided under the head of each of the connecting bolts 58.

FIGS. 5 through 7 illustrate a second embodiment of spacer device satisfying the invention and differing from that previously described in the manner in which the articulatable pre-loaded resilient connection is made between each of the opposite terminal ends of the distance rigid spacer strut and at least one of a cooperating pair of the adjacent separable conductor or elongate member clamping elements.

In this modification or embodiment of the invention, one clamp or clamping element 68 of each cooperating pair 68 and 70 is provided with an inboard substantially right cylindrical boss 72 having an internally threaded bore 74 the axis of which is substantially coplanar and normal to the axis of a conductor or elongate member 76 received within and between the paired cooperating clamp or clamping elements 68 and 70. The cooperating and mating clamping element 70 is terminated centrally inboard to provide a substantially semi-cylindrical saddle formation 78 complementary to the exterior surface of the boss 72 coextensive therewith.

A rigid connector pin element 80 headed at 82, and having its cylindrical shaft threaded at the opposite terminal end at 84, is adapted to be permanently secured within the threaded bore 74, as by a set screw 86, or similar acceptable and conventional locking treatment. However, and before the aforesaid threaded engagement and securement of the pin element 80, two substantially identical weight, length and calculated strength coiled steel springs 90, having closed, ground and squared opposite ends and intermediate active open contiguous coils, and preferably of frusto-conical exterior convolute configuration, are disposed in opposite axial direction over the shank of the pin 80 in maximum or large diameter end engagement with countersunk recesses 92 in opposite faces of an intermediately disposed apertured cylindrical disc or plug member 94, and the headed pin 80 is thereafter threaded into the bore 74 to axially and substantially equally compress the springs 90 under a desired pre-loaded condition of the substantially axially centrally located plug member 94 in unitary assembly of the clamping element 68, headed pin 80, and resiliently pre-loaded intermediate plug or disc member 94.

A so assembled plug member 94 is thereafter axially entered and unitarily secured within the bore of a tubular rigid strut member 96 adjacent each end thereof by inwardly indenting the wall of the strut, preferably circumferentially as at 98, and inward curling or flanging of the extremities thereof, as at 100.

Diametrical clearance relationship is provided between the interior diameter of the frusto-conical coiled springs 90 and shank diameter of the headed pin 80 in the same manner as earlier described hereinabove for headed pin 42 to permit universal axial tilting disposition of the longitudinal axis of each pin 80 in response to relative movement between the clamping element 68 and strut member 96.

It will be understood in this respect that cooperative clamping installation of the cooperating clamping elements 68 and 70 in each pair thereof on a conductor or elongate member 76 will provide a spacer device incorporating the strut 96 and resiliently pre-loaded articulated terminal end connections to adjacent pairs of clamping elements in the same manner described for the embodiment of the invention illustrated in FIGS. 1 through 4. Also, from FIG. 8, it will be observed that clamping bolts 102, preferably with lock washers 104 under their heads, and the elongated apertures or slots 106 through the clamping element 70, will perform in the same fashion as earlier described in connection with FIG. 4.

The frusto-conical coiled steel wire springs 50 and 90 can be replaced by employing frusto-conical tubular elastomeric members such as illustrated at 108 in free axially uncompressed condition in FIGS. 9 and 10. Natural and synthetic rubber may be used for this purpose and the axially directional substitution thereof would follow that of the springs 50 and 90 in each instance.

As a general proposition, aluminum base alloys have been successfully employed for all elements of the spacer devices above described with the exception of the frusto-conical springs 50 and 90 and lock washers 62 and 104, which were selected in the form of stainless steel for compatability and corrosion resistance characteristics in respect of the aluminum base alloy elements of the spacer devices. Also, the natural and synthetic elastomeric materials of the substitutable resilient member 108 may be electrically conductive or electrically non-conductive, where the spacer devices of the invention are employed in single phase bundle conductor installations, without in any way detracting from the effectiveness, scope and intent of the invention.

It will be observed that the invention has provided a spacer device in which opposite terminal ends of a rigid distance spacer strut thereof are each articulatably connected to at least one conductor or elongate member clamping element for application on suspended parallel arrangement of a bundle of two or more such elongate members, and that the articulated connection includes in each instance an elongate pin connector element secured to and rigidly supported by one of the elements comprising the distance rigid spacer strut and a clamping element adjacent thereto; that the pin connector element is unitarily movable with the element supporting the same with its shank projecting through an abutment, such as the bottom apertured wall 52 (FIGS. 1 through 4), or apertured and oppositely recessed plug member 94 (FIGS. 5 through 7), rigidly supported by the other major named element incorporated in each articulated connection; and that pre-loaded resilient means surrounding the shank of the pin connector element in biasing resilient interaction one each interposed and confined between the abutment and opposite ends of the pin connector, permits and provides articulated resiliently restrained movement of the distance spacer strut relative to the clamping elements interconnected therewith in response to relative movements between the conductor or elongate members supporting the spacer device. Manifestly, the interacting pre-loaded biasing resilient means incorporated in the hereinabove described articulated connections of spacer devices falling within the scope of the invention react and function to place the rigid strut element and opposite terminal end clamping elements interconnected thereto in relatively movable condition in respect to the rigid strut and clamping elements under resiliently interacting restraining forces exerted by the springs 50 and 90 and substitutable resilient elastomeric tubular element 108 to thereby provide spacer mechanism devoid of pivotal looseness and wear, heretofore complained of, while insuring full column strength of the rigid strut element resisting collapse of the strut, as well as axial extension thereof.

Solid section round or other configurated rigid bar stock can be substituted for the rigid strut members 40 and 96 in which case the same would be axially counterbored adjacent each opposite terminal end and threaded to receive the connector pin element 42, in the first above-described embodiment of the invention (FIGS. 1 through 4), and similarly counterbored to a much larger interior diameter to fixedly receive the plug member 94, in the second above-described embodiment of the invention (FIGS. 5 through 8).

While specific embodiments of the invention have been selected, illustrated and described hereinabove in practical and useful detail, it will be appreciated to those skilled in the art, to which the invention is addressed, that numerous variations may be made therein without departing from the scope and intent of the invention hereinafter claimed, as follows.

I claim:

1. In a spacer device for maintaining separation between parallel suspended elongate members subject to relative movement in a bundle thereof, said device comprising cooperatively paired separable clamping elements for securement thereof on each elongate member in the bundle, a rigid strut in opposite terminal end articulated connection to one clamping element in each separate cooperative pair thereof adjacent each opposite terminal end of the strut, each said articulated connection including a rigid pin connector element rigidly supported by and extending from one of the named adjacent elements comprising the strut and clamping element adjacent each opposite end of the strut, said pin connector element extending through an apertured abutment rigidly carried by the other named adjacent element, separate resilient means in coaxial surrounding disposition on said pin connector element, one each resilient means being disposed on opposite faces of said apertured abutment and extending away therefrom respectively towards the strut and clamping element, said coaxial resilient means being initially confined and pre-loaded in resiliently biasing relationship in interconnection of each opposite end of the strut and the clamping element adjacent thereto, and each said resiliently biasing interconnection permitting resiliently restrained relative universal movement between said strut and clamping element adjacent the opposite terminal ends thereof.

2. In a spacer device for maintaining separation between parallel suspended elongate members subject to relative movement in a bundle thereof, said device comprising cooperatively paired and separable clamping elements for securement thereof on each elongate member in the bundle, a rigid strut in opposite terminal end articulated connection to one clamping element in each separate cooperative pair thereof adjacent each opposite terminal end of the strut, each said articulated connection including a rigid headed pin connector element unitarily secured to one of the named adjacent elements comprising the strut and clamping element adjacent each opposite terminal end thereof, said pin connector element being rigidly supported by and extending axially away from the element unitarily securing the same through an apertured abutment rigidly carried by the other named adjacent element, the aperture in said abutment being smaller than and preventing passage of the head of the pin connector element therethrough, separate resilient means in coaxial surrounding disposition on said connector pin element, one each of said resilient means being confined between a surface of oppositely disposed surfaces of the abutment and a surface remote thereto along the axis of the pin connector element, said remote surfaces being defined respectively by the underside of the head of the pin connector element and a surface on the element unitarily securing the pin connector element, said coaxial resilient means being initially pre-loaded in resiliently biasing relationship in interconnection of each opposite terminal end of the strut and clamping element adjacent thereto, and said resiliently biasing interconnections permitting resiliently restrained relative universal movement of said rigid strut and clamping elements adjacent the opposite terminal ends thereof.

3. In a bundle spacer device for maintaining transverse separation between normally parallel suspended elongate members subject to relative movement within a bundle thereof, said device comprising cooperatively paired separable clamping elements for receiving one each of the elongate members in securing attachment of the device to said bundle of elongate members transversely to their axes, a rigid strut member in opposite terminal end articulated connection to one clamping element in each separate cooperative pair thereof adjacent each opposite end of the strut, each said articulated connection including a headed pin connector element rigidly secured to and in coaxial alignment with the strut member extending away therefrom through an apertured abutment carried rigidly by the clamping element adjacent thereto, a resilient means supported by said pin connector element and confined between the head thereof and a surface of said apertured abutment facing towards said head, a second resilient means supported by said pin connector element and confined between an opposite surface of the apertured abutment and a surface of the adjacent clamping element facing towards said apertured abutment, said resilient means being initially compressively pre-loaded and providing a resiliently biased interacting interconnection between said strut end and adjacent clamping element, and said resiliently biased interconnection permitting relative universal movement between said strut and each opposite end adjacent clamping element.

4. In a bundle spacer device for maintaining transverse separation between normally parallel suspended elongate members subject to relative movement within a bundle thereof, said device comprising cooperatively paired separable clamping elements for receiving one each of the elongate members in securing attachment of the device to said bundle of elongate members transversely to their axes, a rigid strut member in opposite terminal end articulated connection to one clamping element in each separate cooperative pair thereof adjacent each opposite end of the strut, each said articulated connection including a headed pin connector element rigidly secured to a clamping element and extending rigidly away therefrom axially towards the end of the strut adjacent thereto through an apertured abutment rigidly secured to said strut, resilient means supported by and coaxial with said pin connector element and confined between the head thereof and a surface of the apertured abutment facing towards said head, a second resilient means supported by and coaxial with said pin connector element and confined between an opposite surface of the apertured abutment and a surface of the clamping element adjacent securement of the pin connector element thereto, said resilient means being initially compressively pre-loaded and reacting to provide resiliently biased interconnection between opposite ends of the strut and each clamping element adjacent thereto, and said resiliently biased interconnection permitting relative universal movement between said strut and each opposite end adjacent clamping element.

5. The bundle spacer device in accordance with claim 2 in which each resilient means is a coiled spring of substantially equal free length and strength.

6. The bundle spacer device in accordance with claim 2 in which each resilient means is a coiled spring of substantially equal free length, strength and frusto-conical configuration.

7. The bundle spacer device in accordance with claim 2 in which each resilient means is a frusto-conical elastomeric tubular member of substantially equal free length and strength.

8. The bundle spacer device in accordance with claim 3 in which each resilient means is a coiled spring of substantially equal free length and strength.

9. The bundle spacer device in accordance with claim 3 in which each resilient means is a coiled spring of substantially equal free length, strength and frusto-conical configuration.

10. The bundle spacer device in accordance with claim 3 in which each resilient means is a frusto-conical elastomeric tubular member of substantially equal free length and strength.

11. The bundle spacer device in accordance with claim 4 in which each resilient means is a coiled spring of substantially equal free length and strength.

12. The bundle spacer device in accordance with claim 4 in which each resilient means is a coiled spring of substantially equal free length, strength and frusto-conical configuration.

13. The bundle spacer device in accordance with claim 4 in which each resilient means is a frusto-conical elastomeric tubular member of substantially equal free length and strength.

14. A spacer device for maintaining separation between parallel suspended elongate members subject to relative movement in a bundle thereof, said device comprising cooperatively paired separable clamping elements for its securement to each elongate member in the bundle and installation of the spacer device thereon, a rigid strut connected at opposite terminal ends to at least one of the clamping elements in each separable pair thereof adjacent each opposite terminal end of the strut, said terminal end connections being articulatable in response to relative movement between the elongate members in the bundle thereof supporting the spacer device, at least one of the articulated terminal strut end connections including a pin connector element rigidly secured to and rigidly extending from one of the named adjacent elements comprising the strut and clamping element adjacent thereto and passing through an apertured abutment rigidly carried by the other named adjacent element, separate resilient means in coaxial surrounding disposition on said pin connector element, one each resilient means being disposed on opposite faces of the apertured abutment and extending away therefrom respectively towards the strut and clamping element, said coaxial resilient means being initially confined and pre-loaded in resiliently biasing relationship in interconnection of the terminal end of the strut and adjacent clamping element, and said resiliently biasing interconnection permitting resiliently restrained relative universal movement between said strut and clamping element so interconnected.

References Cited by the Examiner

UNITED STATES PATENTS

| 1,861,532 | 6/1932 | Hough | 174—138 |
| 2,850,560 | 9/1958 | Heyob et al. | 174—138 |

FOREIGN PATENTS

| 685,511 | 4/1930 | France. |
| 827,743 | 2/1960 | Great Britain. |

OTHER REFERENCES

German printed application 1,115,323, Gohring et al., Oct. 19, 1961.

German printed application 1,016,337, Mors, Sept. 26, 1957.

LARAMIE E. ASKIN, *Primary Examiner.*